United States Patent [19]

Stillwagon

[11] 3,836,064

[45] Sept. 17, 1974

[54] METAL FOIL FOR HEATING AND COOLING FOODS

[75] Inventor: James E. Stillwagon, New Kensington, Pa.

[73] Assignee: Aluminum Company of America, Pittsburgh, Pa.

[22] Filed: Feb. 4, 1972

[21] Appl. No.: 223,489

[52] U.S. Cl. ........ 229/3.5 MF, 117/75, 117/132 BE, 161/109, 161/116, 161/146, 161/186, 206/819, 426/113, 426/126, 229/53
[51] Int. Cl. ...................... B65d 81/34, B32b 27/38
[58] Field of Search .................... 229/87 F, 3.5 MF; 206/46 F, 819; 99/171 H, 171 LP; 161/186, 116, 109, 146; 117/75, 132 BE; 426/113, 126

[56] References Cited
UNITED STATES PATENTS

| | | | |
|---|---|---|---|
| 3,070,460 | 12/1962 | Huppke | 117/127 |
| 3,079,912 | 3/1963 | Griem | 99/1 |
| 3,079,913 | 3/1963 | Nelson | 99/171 H |
| 3,185,372 | 5/1965 | Ferraro | 99/171 H |
| 3,469,998 | 9/1969 | Lane | 206/46 F |
| 3,554,770 | 1/1971 | Lipsky et al. | 206/46 F |
| 3,615,711 | 10/1971 | Markus et al. | 99/171 H |
| 3,663,239 | 5/1972 | Rowe et al. | 206/46 F |

*Primary Examiner*—George F. Lesmes
*Assistant Examiner*—Charles E. Lipsey
*Attorney, Agent, or Firm*—Lawrence S. Pope; Arnold B. Silverman

[57] ABSTRACT

An improved metal foil composite sheet and method of fabricating the same for heating and/or cooling food products. Metal foil is coated on one surface with a heat stable, thermoplastic, epoxy and on its second surface with a heat resistant, dielectric, thermosetting base coat and a top coat of a heat resistant, heat absorptive, thermosetting material. The top coat may be applied in zones of distinct thicknesses simultaneously. Such application provides for legible printing, while preserving the desired heat absorptive properties on the entire foil pouch stock including both the printed and unprinted regions. A completed foil pouch composed of the foil composite sheet permits uniform heating and/or cooling of foods over an extended range of temperatures and times while resisting undesired deterioration.

9 Claims, 4 Drawing Figures

3,836,064

METAL FOIL FOR HEATING AND COOLING FOODS

BACKGROUND OF THE INVENTION

1. Field of the Invention

This invention is related to improvements in the metal foils employed in food packages which are used to heat or cool foods. More particularly the invention relates to improvements in the coatings used and their method of application to metal foil pouch stock which is converted into foil packages used to heat foods in the ordinary domestic bread toaster.

2. Description of the Prior Art

Recent developments in the food packaging and servicing industry have led to the increased interest in heating pre-cooked foods in a conventional bread toaster used in the home. It has been known to provide pre-cooked bacon strips in a sealed metal foil pouch which was adapted to be inserted into a toaster for heating to complete cooking. Such pouches and foil pouch stock are disclosed in one or more of the following U.S. Pat. Nos.: 3,469,998; 3,554,770; 2,912,336; 3,615,711 and 3,185,372. The potentially attractive market for pre-cooked foods capable of being heated to completion in a toaster has increased interest in the possibility of providing a wide range of food products which might be pre-cooked for subsequent heating in an ordinary bread toaster.

Bacon strips can be easily prepared in a toaster because of the relatively small cross section of the individual bacon strips. Although problems were encountered regarding grease collection and uniform heating throughout the foil pouch, pouches which are technically satisfactory for the bacon strip application have been developed. It is when one elects to heat foods with larger cross sections and/or densities such as hamburger patties that the current metal foil pouch stock tends to fail, both from the standpoint of non-uniform heating, and consequently non-uniform cooking of the food product within the pouch and the thermal decomposition of the exterior and interior coatings on the foil.

Compounding the above shortcomings of the current metal foil pouch is the fact that larger, denser food products require longer times in the toaster environment in order to heat to completion. Whereas bacon strips may be prepared in a toaster in 90 seconds, the time to heat a hamburger patty to completion may approach 5 minutes. This added time in the toaster materially contributes to the decomposition of known, coated metal foils.

Still another problem has been experienced when attempting to extend the utility of existing metal foil pouch stock to the more lengthy times at the temperature required to complete the cooking process. Many of today's household toasters employ a heat sensor to control the time of product dwell in the toaster rather than a timer or thermocouple in the well of the toaster. The heat sensor measures the quantity of infrared radiation being absorbed or reflected from the object being heated and discharges the object from the toaster heating well when an appropriate temperature is obtained. Toasters employing such a heat sensing device have been difficult to use to heat pre-cooked foods when the food product assumes the size and density of products such as hamburger patty. Printed matter is generally necessary or desirable in order to provide the consumer with readily available heating instructions and to communicate the procedure to be followed when inserting and removing the pouch from the toaster.

Standard printed characters may be provided on the upper portions of the metal foil pouch stock by providing a top coat of one color over a base coat of a different color on the foil and permitting the base coat to show through in the form of printed characters. The size, quality and quantity of these printed characters in turn is all important because their legibility may be affected by the application of the top coat. This is particularly true when the characters are relatively small because the fluid coating migrates uncontrollably to effectively blurr the characters. In practice, the size and frequency of the printed characters controls the weight of top coat which can be applied without adversely affecting the legibility of the printing. When the top coat is of uniform weight and thickness, the unprinted portions of the foil do not receive enough coating material to effectively control the uniformity of heat input into the food product.

It has been known that the rate of heat absorption of metal foil may be varied and consequently controlled by using different colored coatings (U.S. Pat. No. 3,079,912) and by applying coatings to selected regions of the foil (U.S. Pat. No. 3,079,913). Further, U.S. Pat. No. 3,469,998 teaches the technique of applying different colored coatings and overcoatings to different pouch foil sections thereby providing for more uniform heat distributions throughout. These and other prior art teachings do not, however, overcome the problem of retaining uniformity of heat absorption while at the same time providing for legible printing on the foil.

There remains, therefore, a need for a method of applying a top exterior coating to the base coated metal foil to establish distinct variations in coating weight for different portions of the foil pouch stock to provide for legible, printed instructions and uniform heating of the enclosed food. The need is particularly acute with respect to a toaster foil pouch suitable for heating foods in a domestic bread toaster for longer times than heretofore known without an adverse effect on the pouch or its attendant coatings.

BRIEF DESCRIPTION OF THE DRAWINGS

The specific details and scope of my invention can be best appreciated and fully understood by referring to the below described preferred embodiment and drawings.

DESCRIPTION OF THE PREFERRED EMBODIMENTS

Figure 1:
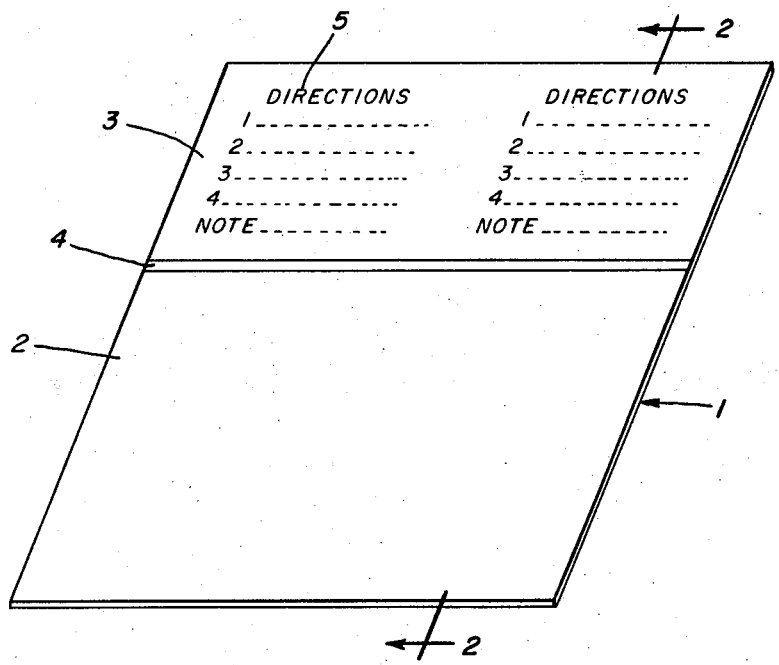
FIG. 1 represents a perspective view of a sheet of metal foil toaster pouch stock prior to pouch fabrication.

Referring more particularly to FIG. 1, coated metal foil toaster pouch stock 1 is illustrated in its finished form preparatory to fabrication into a toaster pouch for use in heating foods. Toaster foil pouch stock 1 is provided with an unprinted region 2, a printed region 3 upon which printed matter 5 is included and a parting zone 4. The relative percentages of the total surface area which is occupied by unprinted and printed regions may be varied to suit the particular needs of the individual end use. The relative coating materials and the thicknesses of the foil and coatings will be more fully described below.

The metal foil 6 is preferably aluminum or one of its alloys although this invention is not necessarily so limited. It will be appreciated by those skilled in the art that other thermally conductive foil materials may be substituted for the aluminum or aluminum alloy foil. Metal foil 6 is preferably provided in thicknesses ranging from 0.0005 inch to 0.0015 inch although foil thicknesses in the range of 0.0005 inch to 0.0059 inch may be employed.

In this the preferred embodiment, the toaster foil composite sheet may ultimately be exposed to one or more of the following thermal conditions:

1. temperatures ranging from about −20°F to about 900°F;
2. temperatures ranging from about 750°F to about 900°F for time periods exceeding about 90 seconds;

The term "thermal conditions" as used herein shall mean any one or more of the above disclosed criteria. In addition, it is preferred to employ a cooling or heating rate of about 15°F/sec.

Figure 2:
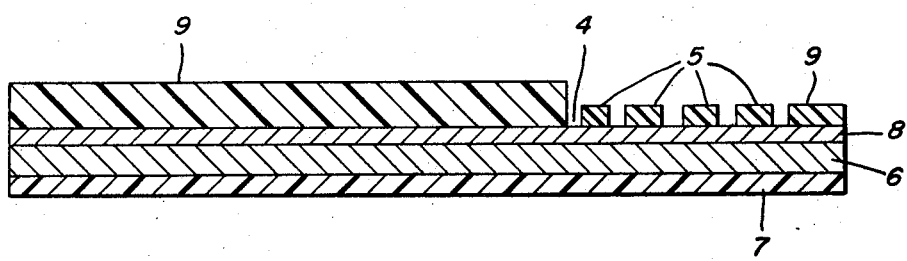
FIG. 2 illustrates cross sectional view 2—2 of the metal foil toaster pouch stock of FIG. 1.

Referring more particularly to FIG. 2, metal foil 6 is provided with a layer of thermoplastic material 7 on a first surface, which will eventually form the interior of the finished toaster foil pouch. While layer 7 need not be applied, it has been observed that the use of layer 7 improves the performance of the foil stock.

In order that layer 7 may be employed successfully, it must be substantially heat stable. The term "heat stable" as used herein shall mean a thermoplastic material which is substantially odorless, substantially adherent, and substantially resistant to decomposition when exposed to at least one of the above-defined thermal conditions.

Layer 7 is preferably applied as a coating onto the surface of metal foil 6. Other methods of providing layer 7 as, for example, by a film may be employed, however, coating the material is the preferred method of application. Layer 7 may be applied in coated weights of about 1 to 4 pounds per ream; a ream being approximately equal to 3,000 square feet of surface. A preferred coating weight of about 1.50 to 2.50 pounds per ream results in a coating thickness of about 0.0001 inch.

Layer 8 is applied to a second surface of metal foil 6 in a sufficient thickness to impart the essential dielectric properties to the foil and is commonly referred to as the base coat. Thermosetting layer 8 in the preferred embodiment is applied in a minimum weight of about 4 pounds per ream and is a heat resistant, dielectric material. The dielectric properties are essential because of the use of the resultant pouch in an electrically energized toaster. The term "heat resistant" as used herein shall mean a material which will not soften appreciably, and will remain substantially odorless, substantially adherent and substantially resistant to decomposition when exposed to at least one of the above-defined thermal conditions.

Layer 9 consists essentially of a thermosetting epoxy material which is substantially heat resistant heat absorptive and visually distinguishable from layer 8. The heat absorptive quality of thermosetting epoxy 9 is critical to the performance of the invention. The term "heat absorptive" means that the thermosetting epoxy 9 in this instance is substantially receptive to the passage of infrared radiation and increases the emissivity of the exterior surface of the foil stock to about 50 percent to 90 percent.

As may be observed from a closer inspection of FIG. 2, thermosetting layer 9 is secured to thermosetting layer 8 which in turn is present on the metal foil pouch stock. Thermosetting layer 9 is applied in different predetermined weights for different regions of the metal foil pouch stock as detailed hereinafter to insure uniform heating of the enclosed food while providing for legibly printed instructions on the pouch.

In one preferred embodiment a heat receptive additive in the form of carbon black is included in thermosetting layer 9. Also, other heat receptive additives could be substituted for carbon black where said substitutes have an emissivity of at least about 80 percent. The carbon black is preferably added in the form of flake to thermosetting layer 9 prior to coating by admixing it with the epoxy. About 3 percent to 6 percent by weight of carbon black has been found to be beneficial with about a minimum of 5 percent preferred. The carbon black addition permits the coated toaster foil pouch to absorb heat at a more rapid rate at comparable temperatures than would be possible without the carbon black present.

Figure 3:
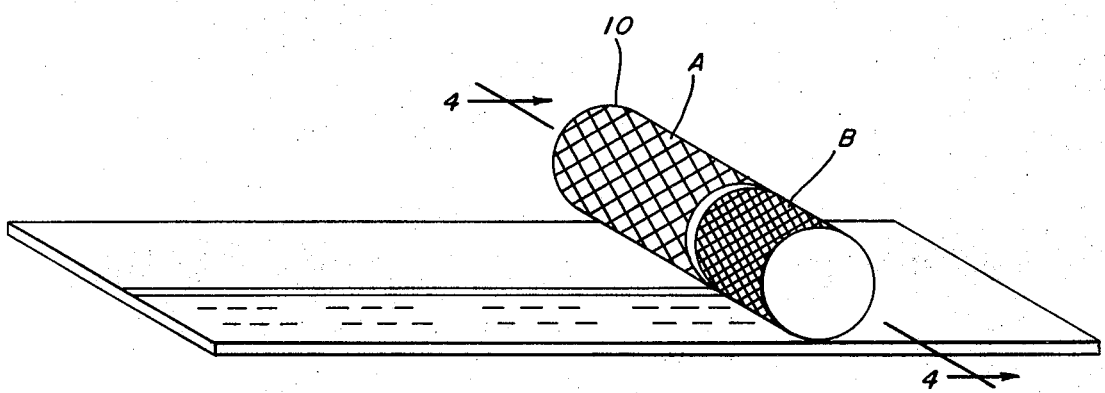
FIG. 3 illustrates one form of apparatus for practicing the method of this invention in applying the top exterior coating.
Figure 4:
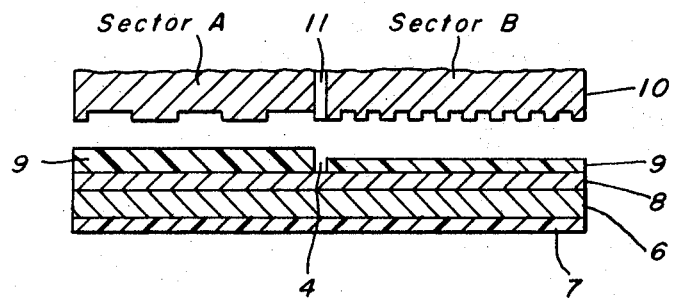
FIG. 4 represents a cross sectional view of the coating apparatus and underlying foil stock of FIG. 3 taken through 4—4.

Thermosetting layer 9 may be applied as a coating overlying thermosetting layer 8 as is illustrated in FIGS. 3 and 4. Preferably, a rotogravure cylinder 10 is employed to apply thermosetting epoxy 8. The rotogravure cylinder 10 is adapted to apply distinct coating weights of thermosetting layer 9 at different regions of the underlying foil composite. Referring again to FIG. 1, regions 2, 3, 4 and 5 are provided with distinct weights of thermosetting layer 9 in this preferred embodiment. Region 2 is preferably coated with about 1.50 to 4 pounds per ream. Region 3 is preferably coated with about 15 percent to 70 percent by weight less than the applied weight of coating in region 2 of the toaster foil stock. An economically advantageous arrangement involves a coating weight of about 2 pounds per ream and 1.50 pounds per ream in regions 2 and 3, respectively.

Region 2 in this preferred embodiment comprises a minimum of at least about 60 percent of the surface area of the foil pouch stock which is adapted to be used for the fabrication of toaster pouches. A minimum of about 60 percent of region 2 has worked well in toasters equipped with electric timers, thermocouples, and heat sensors, for example. The surface area of region 2 may be a minimum of about 10–15 percent when the foil stock is particularly adapted for use in a toaster of the heat sensor type. In such a case, a "target area" may be provided on the foil pouch stock equivalent in coating weight to that disclosed herein for region 2. This target area is positioned on the foil stock such that it substantially aligns with the heat sensor within the toaster during the cooking or heating cycle. This will generally be on the lower one half of the formed pouch.

Region 4 is FIG. 1 is preferably devoid of top exterior coating, thermosetting epoxy layer 9, as is region 5 which spells out the message desired in the form of printed matter. Referring again to FIG. 4, region 4 results from the parting line 11 between the screen openings provided in Sectors A and B of rotogravure cylinder 10. The number and sizes of the screen openings shown in FIGS. 3 and 4 for purpose of clarity of illustration have been shown in a somewhat schematic arrangement and are not necessarily drawn to scale. If desired other printing methods may be used as a substitute for the rotogravure cylinder. Multiple width foil strips may be prepared in the same fashion as has been described for the single width herein with subsequent slitting being effected.

The resulting metal foil toaster pouch stock possesses superior performance attributes as compared with existing metal foil toaster pouch stock. It can be successfully utilized up to temperatures of about 900°F for times greater than about 90 seconds and when exposed to heating and cooling rates greater than about 15°F/second. Further it can be used in all forms of household toasters, and is not limited in application to use in a toaster of the heat sensor type. Additionally, the finished pouch has legible printing and higher integrity coatings than heretofore used in the pre-cooked food products industry.

The advance over the prior art can best be manifested with the following examples:

EXAMPLE 1

An 0.0015 inch thick sheet of aluminum foil composed of alloy 1100-0 was coated on one surface with a substantially colorless thermoplastic epoxy resin heat seal coating. A coating thickness of 0.0001 inch, equivalent to 2.00 pounds of lacquer per ream, was employed. This coating is adapted to provide the interior surface of the toaster foil pouch. An exterior base coat consisting of a thermosetting, dielectric epoxy, orange in color was next applied to the second surface of the aluminum foil (later to serve as the exterior surface of the finished pouch) in a thickness of 0.0002 inch, equivalent to 4 pounds of lacquer per ream. Both the heat seal and base coatings were applied with conventional foil coating apparatus. The blue, top, exterior coat was also a thermosetting epoxy to which was added 5 percent by weight of carbon black in the form of flakes. The blue top coat was applied such that the orange base coat was permitted to show through in specified regions to provide printed instructions on the foil stock. This uneven distribution was accomplished with a rotogravure cylinder having different sized screen openings in the printed region than the screen openings in the unprinted region. Consequently, a top coat was applied in a coated weight of 1.50 pounds per ream in the printed regions and 2.00 pounds per ream in the unprinted regions of the foil stock in one operation. The printed instructions were clearly legible and the required coating thicknesses of the top, heat absorptive coating was provided in all regions of the subsequently formed pouch.

EXAMPLE 2

Foil stock manufactured in accordance with example number 1 was fabricated into toaster foil pouches and tested in an ordinary domestic bread toaster for times exceeding 90 seconds for pouches containing refrigerated pre-cooked bacon and for 4 to 5 minutes for pouches containing frozen pre-cooked hamburger patties. The pouches tested for 90 seconds containing bacon did not undergo any visible signs of coating deterioration and the bacon food product was not adversely affected with regard to taste. Similarly, pouches tested for 4 to 5 minutes containing hamburger patties manifested no visible signs of coating deterioration other than a very slight discoloration of the exterior coating which in no way adversely affected the performance of the pouch. The contained hamburger patties were satisfactorily cooked to completion with no adverse effect upon the taste.

Whereas particular embodiments of the invention have been described above for purposes of illustration, it will be evident to those skilled in the art that numerous variations of the details may be made without departing from the invention as defined in the appended claims.

I claim:
1. A foil pouch for heating foods comprising
   a metal foil pouch body,
   a layer of heat stable, thermoplastic material secured to an inner surface of said pouch body,
   a layer of a heat resistant, dielectric material secured to an exterior surface of said pouch body, and
   a heat resistant, heat absorptive material overlyingly secured to and visually distinguishable from said heat resistant dielectric layer,
   said heat resistant, heat absorptive material being present in at least one first region having a first layer thickness and at least one second region having a second layer thickness,
   said first region having a coating weight of about 1.50 to 4.00 pounds per ream, covering at least 10 percent of the surface area of said pouch and being applied to a portion of the lower one-half of said foil pouch, and
   said second region having a coating weight of about 15 to 70 percent lighter than the coating weight within said first region, and at least a portion of said second region being provided with indicia by allowing said heat resistant, dielectric layer to be visually exposed through discontinuities in said heat resistant, heat absorptive layer.

2. The foil pouch of claim 1 wherein said first regions cover at least about 60 percent of the exterior surface area of said pouch.

3. The foil pouch of claim 1 wherein
   a minimum of about 5 percent by weight of a heat receptive additive is included in said heat resistant, heat absorptive layer, and
   said heat receptive additive is characterized by a minimum emissivity of about 80 percent.

4. The foil pouch of claim 3 wherein said heat receptive additive is carbon black.

5. A composite sheet comprising
   a metal foil material,
   a layer of heat stable, thermoplastic material on a first surface of said metal foil material,
   a layer of heat resistant, dielectric material on a second surface of said metal foil material,
   a heat resistant, heat absorptive material overlyingly secured to and visually distinguishable from said heat resistant, dielectric material,
   said heat resistant, heat absorptive material being present in at least one first region having a first layer thickness and at least one second region having a second layer thickness, said first region having a coating weight of about 1.5–4.0 pounds per ream, covering at least 10 percent of the surface area of said sheet and being applied to a portion of the sheet which is adapted to be in the lower one-half of a foil pouch formed from said composite sheet, and said second region having a coating weight about 15 to 70 percent lighter than the coating weight within said first region, at least a portion of said second region being provided with indicia by allowing said heat resistant, dielectric layer to be visually exposed through discontinuities in said heat resistant, heat absorptive layer.

6. The composite sheet of claim 5 wherein said first regions cover at least about 60 percent of the surface area of said sheet.

7. The composite sheet of claim 5 wherein said heat resistant, heat absorptive layer is a coating.

8. The composite sheet of claim 7 wherein about 5 percent by weight of heat receptive additive is included in said heat absorptive, heat resistant coating, said heat receptive additive being characterized by a minimum emissivity of about 80 percent.

9. The composite sheet of claim 8 wherein said heat receptive additive is carbon black.

* * * * *